Dec. 14, 1965     W. SCHEERMESSER     3,222,697
PROFILED POLYURETHANE FOAM ARTICLES OF MANUFACTURE
Filed June 29, 1956     6 Sheets-Sheet 1

INVENTOR
Wilhelm Scheermesser
BY Stevens, Davis, Miller and Mosher
ATTORNEYS

INVENTOR
Wilhelm Scheermesser

Dec. 14, 1965 W. SCHEERMESSER 3,222,697
PROFILED POLYURETHANE FOAM ARTICLES OF MANUFACTURE
Filed June 29, 1956 6 Sheets-Sheet 5

INVENTOR
Wilhelm Scheermesser
BY Stevens, Davis, Miller and Mosher
ATTORNEYS

United States Patent Office 3,222,697
Patented Dec. 14, 1965

3,222,697
PROFILED POLYURETHANE FOAM ARTICLES OF MANUFACTURE
Wilhelm Scheermesser, Bad Honnef, Germany, assignor to Mobay Chemical Company, a corporation of Delaware
Filed June 29, 1956, Ser. No. 594,819
Claims priority, application Germany, July 4, 1955, Sch 15,400, Patent 1,706,682; July 5, 1955, Sch 15,418, Patent 1,709,027, Sch 15,423, Patent 1,709,028; Oct. 5, 1955, Sch 15,995, Patent 1,713,841, Sch 15,996, Patent 1,713,842; Oct. 28, 1955, Sch 16,153, Patent 1,718,704, Sch 16,154, Patent 1,710,495
13 Claims. (Cl. 5—361)

This invention relates to profiled polyurethane foam articles of manufacture. More particularly, the invention relates to certai narticles of manufacture intended for use as seat cushions, mattresses, bed pads, upholstery coverings, soundproofing, pillows, carpet underlinings, and the like, wherein the articles in question are made of polyurethane foam material which has been subjected to shaping operations in such a way as to impart thereto in cross-section one of a number of certain desirable profiles to be hereinafter more fully described. Still more particularly, the invention relates to composite articles of manufacture comprising at least one piece or mass of profiled polyurethane foam which is united or laminated, such as by an adhesive, by high frequency heat-sealing, or the like, together with at least one other piece or mass of material which latter may or may not also comprise a profiled polyurethane foam. Finally, the invention relates to profiled polyurethane foam articles of manufacture in which the profile in question is characterized by a plurality of substantially parallel grooves in at least one surface of the polyurethane foam, the grooves being of any desired configuration such as represented by substantially straight-sided ribs, by angular ribs, by trapezoidal ribs, by wavy ribs, etc.

The initial foam material from which articles of manufacture are made according to the present invention is a synthetic resinous composition of matter based on the combination of polyesters and isocyanates. This material has achieved a well-defined status in the art, especially since World War II, and is also commonly known as polyurethane foam. The present invention is not concerned in any way with the chemistry of such materials or the particular way in which it is initially manufactured, and hence it is to be particularly understood that it is applicable to polyurethane foam from any source quite irrespectively of specific compositions and/or the specific way in which it might have been manufactured.

It has already been proposed to employ foam rubber sheets and slabs for the manufacture of various articles such as seat cushions, mattresses, etc. In the case of thick slabs of foam for uses such as these, it has been proposed to impart additional resiliency to the resulting articles by providing them with a plurality of more or less cylindrical core spaces extending from one surface of the foam rubber for some distance into the slab. These core spaces may be made initially such as by casting the foam rubber-producing mix into suitably shaped molds or by using core saws to remove cylindrical "plugs" of foam rubber from slabs of same. Neither of these methods is well-suited for use with polyurethane foam, the former because of the difficulty in obtaining the desired uniformity of pore structure throughout the entire mass and the latter because of the greatly increased cost of labor plus waste of polyurethane foam material in the form of the "plugs" thus removed. Moreover, the compression characteristics of the resulting cored polyurethane foam structure leaves much to be desired.

It is therefore an object of the present invention to provide new and improved profiled polyurethane foam articles of manufacture.

It is a further object of the invention to produce new and improved articles of manufacture, such as seat cushions, mattresses, bed pads, upholstery coverings, soundproofing, pillows, carpet underlinings, and the like, having improved compression characteristics, and made from suitably profiled polyurethane foam.

The manner in which these and other objects of the invention are attained will become more apparent from the following description of the invention, wherein reference is made to specific embodiments of the invention merely as illustrative and not by way of limitation.

Briefly, in accordance with the present invention polyurethane foam of a conventional and well-known type, and which desirably may be a flexible polyurethane foam of generally open-pore structure, is subjected to a shaping operation such as to provide profiled polyurethane foam sheets or slabs in which the profile—which may be imparted to one or both extended surfaces of the polyurethane foam—results from a plurality of substantially parallel grooves. Stated differently, the profiled polyurethane foam structures of the present invention are characterized by a plurality of essentially parallel ribs which may have any desired cross-section, such as straight-sided, angular, trapezoidal, wavy, etc. The desired profile may be imparted to the polyurethane foam starting material in any desired manner, but the use of a somewhat modified hot wire cutting device represents a particularly convenient way of obtaining whatever profile may be sought. When the profiled polyurethane foam is thus obtained, it may if desired be covered with a suitable cloth or other covering material conventionally employed in making seat cushions, mattresses, etc., or it may be laminated with another material, which may or may not be a similarly profiled polyurethane foam material, and the resulting laminate then covered with cloth or other suitable protective and/or decorative fabric or the like. When a plurality of profiled polyurethane foam structures are laminated, especially in manufacturing seat cushions, mattresses, or other body-supporting shapes, it is an especial feature of the present invention that the individual profiled polyurethane foam pieces constituting the final laminated product are placed in such fashion that the parallel grooves of each are at an angle, preferably but not necessarily 90°, with respect to the adjacent one. The plurality of pieces of the laminate may or may not be united by a suitable adhesive, such as a conventional polyurethane adhesive composition, or by heat-sealing, or the like, as desired.

In order to provide a still better understanding of the invention, a number of specific embodiments are described in conjunction with the accompanying drawings, in which:

FIGURES 4, 5 and 6 show a single profiled polyurethane foam structure wherein the cross-section of the profile is angular, wavy, and trapezoidal, respectively, instead of being straight-sided as in FIGS. 2 and 3;

FIGURE 7 shows a single profiled polyurethane foam structure cut as in FIG. 2 but having a shaped outer contour to conform to a predetermined shape for a seat cushion, or the like;

Figure 1:
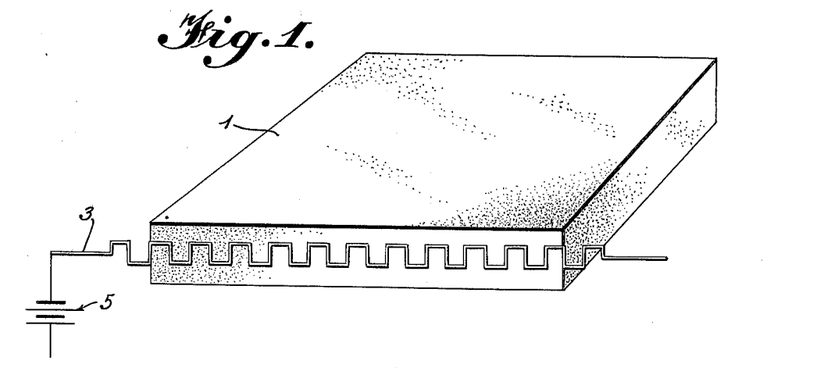
FIGURE 1 shows schematically a slab of polyurethane foam just about to be cut in a hot wire cutting machine.

Referring now to these several figures in greater detail, in FIG. 1 there is shown a slab or sheet of polyurethane foam 1 which may be made from any conventional polyurethane-producing formulation treated in any conventional manner in order to produce the desired cured polyurethane foam structure. This slab or sheet has substantially flat parallel surfaces and is cut or severed in an otherwise conventional hot wire cutting device (not shown) by placing it on the carriage of the machine and causing relative movement between it and an electrically heated hot wire 3 energized from a suitable source of electricity 5. The hot wire cutting device is, broadly speaking, of a known type (e.g., see Jaye U.S. Patent No. 2,692,328) and is therefore not illustrated, it being sufficient to point out that it is only necessary to employ a wire that is sufficiently large and strong to retain the predetermined shape (when heated) that will impart to the polyurethane foam the desired profile.

Each of the cut or severed pieces 7 and 9 (FIG. 2) has a smooth and a profiled surface. They are then made up into a commercially desirable laminated or composite structure, preferably by turning the cut piece 7 through 90° about a vertical axis and then superimposing it over the piece 9 with the parallel ribs adjacent each other. The two pieces 7 and 9 may be retained securely in place by the use of a suitable adhesive composition, such as one preferably (but not necessarily) made of a conventional polyurethane-base adhesive.

Figures 4, 5:
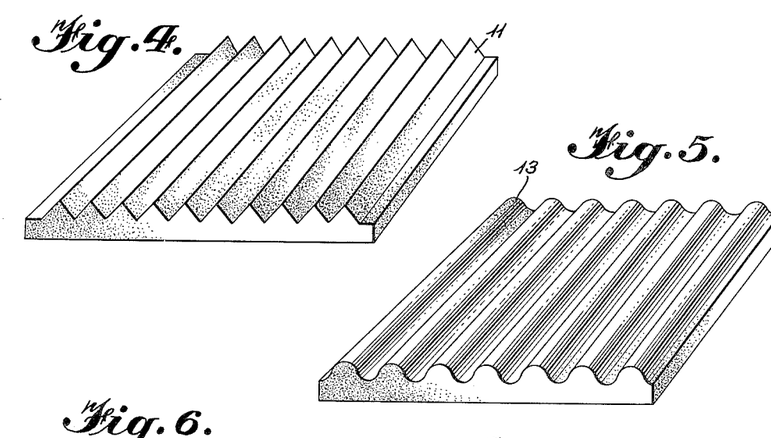
Figures 6, 7:
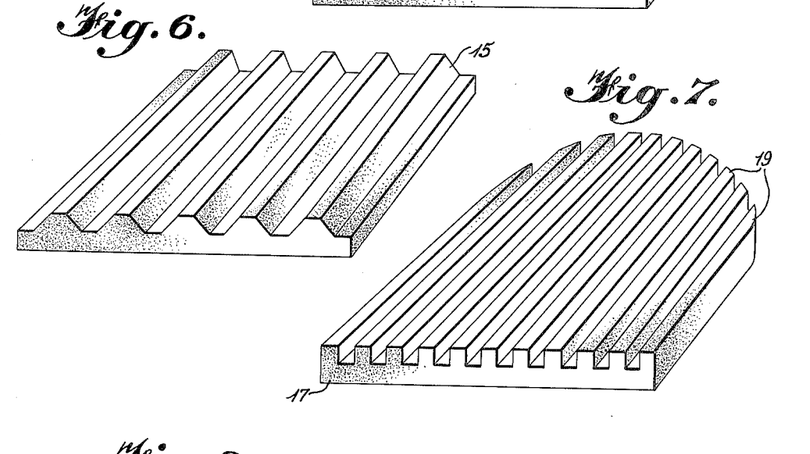

By suitably shaping the wire of the hot wire cutting device, instead of parallel ribs (or grooves) having straight sides as in FIG. 1 one may obtain parallel ribs or grooves having angular sides 11 as in FIG. 4, ribs having a wavy or sinusoidal configuration 13 as in FIG. 5, or ribs having a trapezoidal configuration 15 as in FIG. 6.

Figure 2:
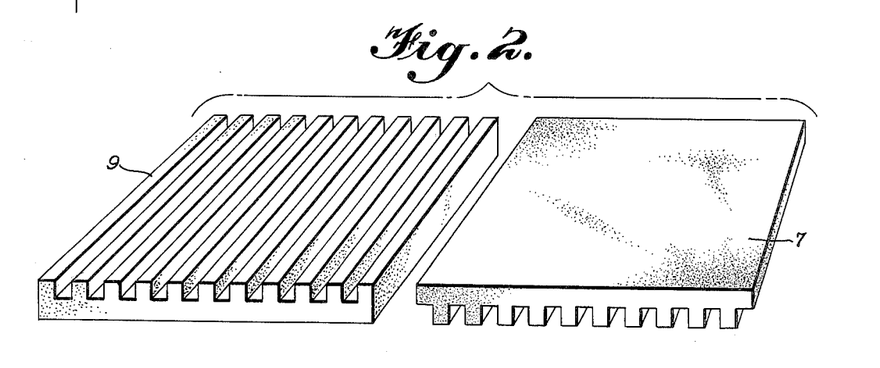
FIGURE 2 shows the resulting two profiled polyurethane foam structures as obtained by the operation shown in FIGURE 1.

In FIG. 7 a profiled polyurethane foam element 17 is shown which is made by providing a slab or sheet of profiled polyurethane foam such as 9 of FIG. 2 with an outer contour 19 that will be rounded or otherwise conform to the shape of a chair seat or other article of furniture or the like. The seat proper to which the contoured foam element conforms in shape may be made of steel, wood, or other conventional construction material. Instead of such an element 17 having straight-sided grooves as shown in FIG. 7, the grooves may have other shapes such as shown in FIGS. 4, 5 or 6. Moreover, the rounded outer contour 19 may be provided on a laminated or composite profiled polyurethane foam structure such as that shown in FIG. 3 if desired.

Figure 3:
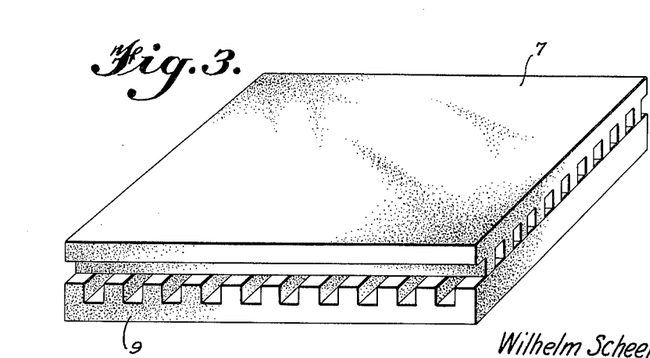
FIGURE 3 shows a laminated article of manufacture obtained by rotating one of the structures shown in FIG. 2 through 90° and then superimposing them with the profiled cut surfaces of each adjacent to each other.
Figure 8:
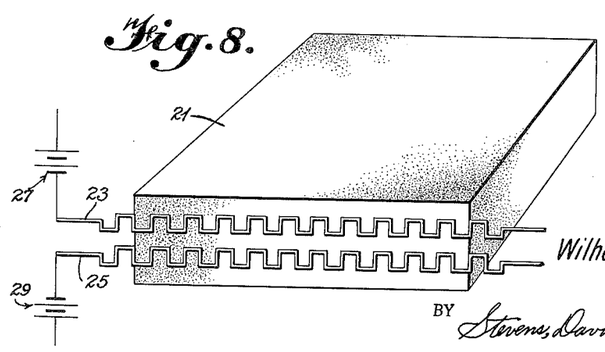
FIGURES 8, 9 and 10 correspond to FIGS. 1, 2 and 3, respectively, and show profiled polyurethane foam structures as obtained by making a plurality of cuts (for example, two) in the initial slab or sheet of polyurethane foam instead of one cut as in FIG. 1.
Figure 9:
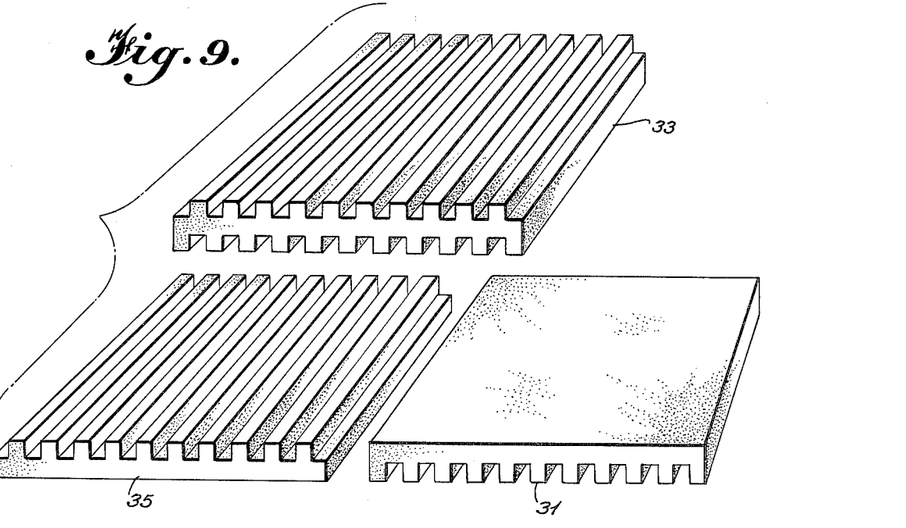
Figure 10:
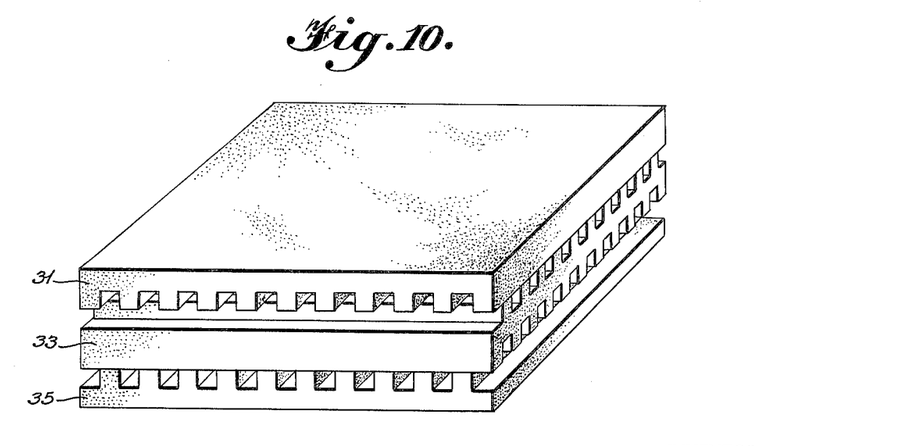

Instead of cutting or severing a slab or sheet of polyurethane foam into merely two profiled elements as shown in FIGS. 1 to 3, it is also within the contemplation of the present invention to form simultaneously three or more such elements. This is shown in FIG. 8 where a block or sheet of polyurethane foam 21 is about to be cut on an otherwise conventional hot wire cutting machine into three profiled elements by the hot wires 23 and 25 supplied with energy from suitable sources of electricity 27 and 29, respectively. The three profiled elements 31, 33 and 35 thus produced are shown in FIG. 9, it being apparent that unlike the remaining two elements the middle element 33 is profiled on both its top and bottom surfaces. By rotating the middle element 33 through 90° about its vertical axis and then superimposing the three profiled elements 31, 33 and 35 as shown in FIG. 10, a composite or laminated profiled polyurethane foam structure having excellent compression-stress characteristics is obtained. As in the case of FIG. 3, the several elements may be secured in laminated position with a suitable adhesive or by heat sealing. By suitable variations in the shape of the hot wires 23 and 25 as described above in connection with FIG. 1, the three-element laminate of FIG. 10 may be given any desired cross-section as regards the profile of the individual elements, e.g., so that the parallel ribs thereof will be shaped as shown in FIGS. 4, 5 or 6, or otherwise.

By forming profiled polyurethane foam structures as thus described, the elasticity of the resulting structure is greatly improved for the uses mentioned above. This is especially true of the laminated or composite structures made from two or more profiled polyurethane foam elements as shown in FIGS. 3 and 10. The individual profiled elements may be manufactured on a large scale at reduced costs so far as labor and wastage of valuable polyurethane foam material are concerned, while at the same time utilizing the desirable physical properties thereof to the maximum. The use of the profiled polyurethane foam elements made according to the present invention gives a structure characterized by air holes or air spaces in addition to the small air spaces afforded by the individual pores or cells of the polyurethane foam itself, and the presence of these additional air holes or air spaces imparts especially desirable cushioning properties to these structures. This effect is particularly evident in laminated or composite profiled polyurethane foam structures where the crossed juxtaposed ribs and grooves give a maximum of additional air spaces that result in unusually desirable cushioning properties.

By way of example of suitable dimensions, the slab of polyurethane foam as shown in FIG. 1 may be thirty millimeters thick whereas the thickness of each of the profiled elements of FIG. 2 may be twenty millimeters, the height of the ribs (or depth of the grooves) being ten millimeters. The composite structure of FIG. 3, which may be forty millimeters thick, has a very substantially increased degree of elasticity (as opposed to the initial slab of FIG. 1) due to the air gaps or air spaces between the crossed ribs, thereby permitting a greater degree of air circulation. Other dimensions may of course be employed. When the cutting or severing operation takes place in a hot wire cutting machine, the surface material of the polyurethane foam in contact with the wire may be at least superficially melted due to the heat from the hot wire which may be at or near at least a red heat during the actual cutting operation. There is substantially no loss of valuable polyurethane foam material as a result of the profiling operation.

Instead of uniting two profiled polyurethane foam elements by means of an adhesive or by high frequency or dielectric heating into a laminate such as shown in FIG. 3, one such profiled polyurethane foam element may be united with an otherwise similarly shaped element or with a plain sheet or slab consisting of or made from an entirely different material, such as rubber filaments, foam rubber, various textiles, etc.

The three-or-more-element laminated or composite article as shown in FIG. 10 is especially desirable for use as mattresses and bed pads.

In order to demonstrate that profiled polyurethane foam structures made according to the present invention show substantially improved properties in regard to their resiliency or elasticity, the following tests were performed:

Two samples of a pale yellow polyurethane foam mattress material were made up into test pieces, one being profiled in accordance with the present invention and the other being non-profiled. Both test pieces were 12 cm. thick, the profiled test piece consisting of two sheets each having a thickness of 6 cm. and profiled in trapezoidal form as shown in FIG. 6. The grooved or profiled sheets were crossed over each other at 90° and glued together. The cross-section of the profile was such that the ribs were 3.5 cm. in height, 1.5 cm. in width at the top, and 3.5 cm. in width at the bottom, with a "pitch" of 5.0 cm. The recoil or resilience elasticity was determined by letting a steel bar or rod hit against the sample at high speeds. The recoil or rebound of the bar is read off on a scale. In this way it was determined that the recoil elasticity was 22% for the non-profiled test piece and 36% for the profiled test piece under the same test conditions, so that the resiliency of the profiled test piece was about 64% greater.

The test was repeated, this time using two samples of a blue polyurethane foam mattress material made up into test pieces 10 cm. thick. The profiled test piece consisted of two sheets glued together each having a thickness of 5 cm. and wavecut as shown in FIG. 5. The grooved or profiled sheets were crossed over each other at 90°. The cross-section was in the form of a sine wave with ribs having a height of 2.0 cm. and a "pitch" of 5.0 cm. The recoil elasticity was 22% for the non-profiled test piece and 33% for the wave-cut profiled test piece under the same test conditions, the degree of improvement therefore being of the order of about 50%.

Comparative tests were also made on the one hand with latex foam rubber test pieces having numerous cored-out portions from one surface thereof and on the other hand with test pieces made from two wave-cut polyurethane foam elements (each profiled as in FIG. 5) crossed at 90° on top of each other and adhesively united. Tests were made to determine the comparative responses of these test pieces under conditions of linear vibration, circular vibration, and vibration damping effect. These tests show that the shock absorbency of the latex foam test pieces is considerably less than that of the laminated profiled polyurethane foam test pieces under conditions of linear vibration, that essentially the same thing is true under conditions of circular vibration, and that the vibration damping effect under sudden shock is approximately twice as favorable in the case of the laminated profiled polyurethane foam test pieces, i.e., that the vibration or shock wave died out or was damped in approximately half the time (about 0.7 second vs. about 1.4 seconds) by the laminated profiled polyurethane foam test pieces as compared to the cored-out latex foam test pieces.

Figure 11:
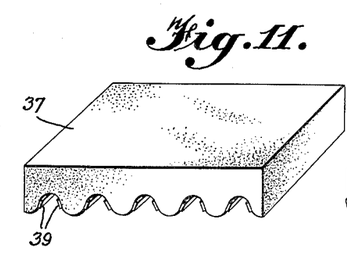
FIGURE 11 shows a modification of the profiled polyurethane foam structure wherein the individual ribs are supported or reinforced by strips of a suitable covering material.

Returning to the drawings, FIG. 11 shows a profiled (here, wave-cut) polyurethane foam element 37 having a plurality of elongated thin narrow strips 39 securely fastened, such as by gluing, to the ribs of the element. In the particular embodiment shown, one such strip is fastened to each side of each rib and serves to reinforce the rib against undue deflection or loading, thereby increasing the spring elasticity of seat cushions, upholstery coverings, mattresses, etc. made from these elements so reinforced. The holding or supporting strips may be made out of any suitable material such as metal, synthetic resins, heavy paper or cardboard, or other elastic pliable material, so that the ribs of the profiled polyurethane foam will more easily retain their shape and will not collapse upon bending or compression of the profiled polyurethane foam element under conditions of heavy load.

Figure 12:
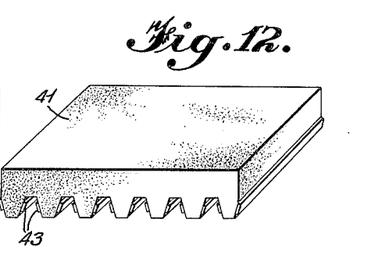
FIGURE 12 is similar to FIG. 11 except for the cross-section of the profile.

FIG. 12 is similar to FIG. 11 except that the profiled polyurethane foam element 41 has ribs that are trapezoidal in shape as in FIG. 6 to which the strips 43 are applied.

Figure 13:
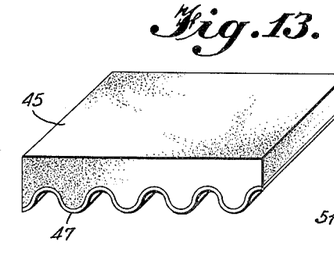
FIGURES 13 and 14 are similar to FIGS. 11 and 12, respectively, except that the outer covering or reinforcing material is continuous instead of in the form of thin elongated strips attached to the several ribs of the profiled polyurethane foam structure.
Figure 14:
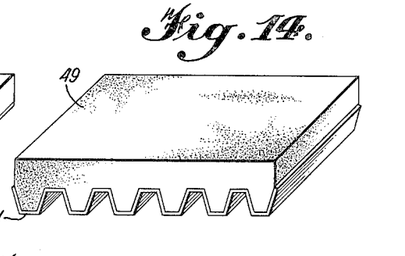

FIGS. 13 and 14 are similar to FIGS. 11 and 12, respectively, except that the outer covering or reinforcing material for the ribs is continuous so that the ribs are completely covered or enclosed. Thus in FIG. 13 the ribs of the profiled element 45 are completely enclosed by the continuous layer 47 tightly secured thereto, while in FIG. 14 the ribs of the profiled element 49 are completely enclosed by the continuous layer 51 tightly engaging them by suitable means such as gluing or heat sealing. The continuous layers 47 and 51 may if desired be formed from a springy or resilient synthetic resinous material.

Alternatively, if desired, the cover or reinforcing material may be applied to the profiled polyurethane foam by means of a synthetic resin or rubber solution or the like. In this way a relatively air-impervious seal is obtained, so that air originally held within the polyurethane foam body proper will be retained therein so as to minimize the collapsing effect under conditions of heavy load. There results in this way an air cushion, as it were.

Figure 15:
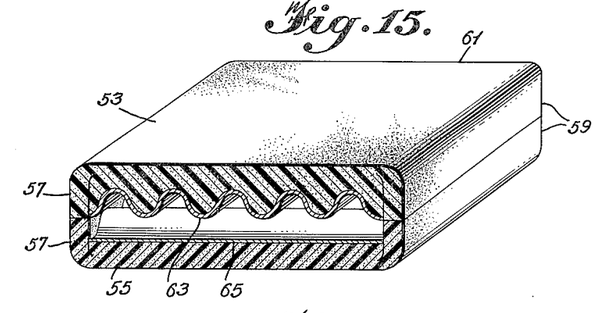
FIGURE 15 shows a laminated article of manufacture made from two profiled polyurethane foam structures each like that shown in FIG. 13.

A similar result may be obtained by the arrangement shown in FIG. 15, where two profiled sections 53 and 55 are laid on top of one another, after rotating one through 90° about its vertical axis, and the ends 57, 57 and 59, 59 sealed together by gluing or by heat sealing. The ends 61, 61 and the ends in the direction opposite thereto (not shown in the drawing) are also sealed together in similar fashion, whereby the interior of the laminated profiled polyurethane foam article between the crossed ribs of elements 53 and 55 will constitute an air space to reduce collapsing by means of the resulting, in effect, air cushion. If desired, this embodiment may also by provided with the covering or reinforcing supporting layers 63 and 65 secured to the ribs of elements 53 and 55, respectively. The construction shown in FIG. 15 (with or without the layers 63 and 65) when employed as a seat cushion, upholstery covering, mattress, pillow, etc., has greatly improved spring or resiliency characteristics.

Figure 16:
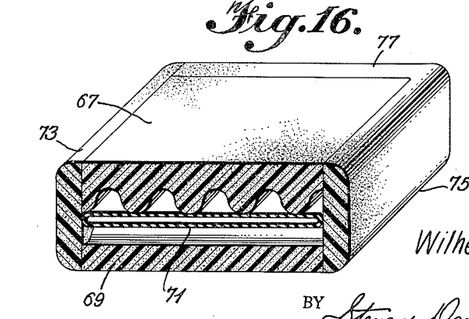
FIGURE 16 shows a laminated article of manufacture in which each of the top and bottom components is similar to that of FIG. 5, but with an extra intermediate air cushion which may take the form of a rubber air cushion.

Another embodiment is shown in FIG. 16, wherein a plurality of profiled polyurethane foam sheets (for example, two as indicated by reference numerals 67 and 69) are combined with a true separate air cushion element, such as a rubber air cushion 71, to provide a composite structure having desirable elastic and resilient properties.

Instead of turning the ends of the profiled polyurethane foam sheets over into abutment and uniting them by gluing or heat sealing as shown in FIG. 15, it may sometimes be preferred to cover the sides and edges with separate polyurethane foam strips which are then united to the main body of polyurethane foam material by gluing or heat sealing. The edges of these polyurethane foam strips may be rounded off to present a pleasing appearance and/or shape. Such strips are indicated by the reference numerals 73, 75 and 77, it being understood that preferably another similar strip (not shown) would be fastened over the "front" of the laminate opposite strip 77. These strips help to maintain a substantial air pocket in the interior of the laminate and desirably increase the spring elasticity of any of the composite or laminated structures heretofore shown and described.

Figures 17, 18:
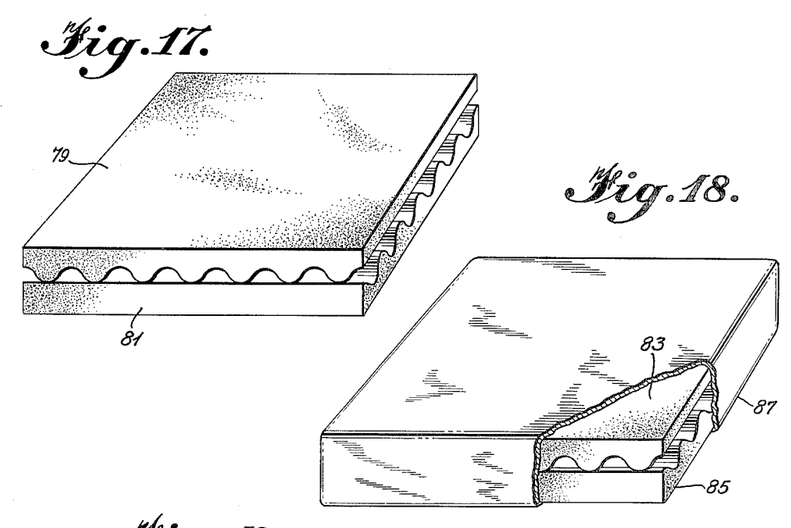
FIGURE 17 shows a laminated or composite profiled polyurethane foam article of manufacture similar to that of FIG. 3 but of which the individual components consist of the so-called wave-cut polyurethane foam element of FIG. 5.
FIGURE 18 is similar to FIG. 17 but shows an otherwise conventional covering, such as fabric or the like, for the article of manufacture shown in FIG. 17.

FIG. 17 shows two wave-cut polyurethane foam elements 79 and 81 each similar to that shown in FIG. 5, the ribs of each element being crossed over the ribs of the other. These elements may be bonded to each other by gluing or heat sealing. This two-element laminated construction forms a particularly desirable basic article of manufacture especially useful for any of the purposes mentioned above, including profiled head pillows.

FIG. 18 shows two wave-cut polyurethane foam elements 83 and 85 similar to those of FIG. 17 and similarly arranged, the whole laminate being enclosed by a protective and/or decorative covering 87 made of any desired material such as fabric, synthetic resin sheeting, etc.

For example, head pillows are readily made in this way from a solid slab of polyurethane foam material having a total thickness of 75 mm. This is wave-cut into two sheets each having a plane and a profiled surface and a (maximum) thickness of 50 mm. Upon crossing these 90° to one another and uniting them as shown in FIG. 17 or 18, a head pillow having a total thickness of 100 mm. is obtained. The ends may be closed off as shown in FIG. 15 or as shown in FIG. 16.

Figure 19:
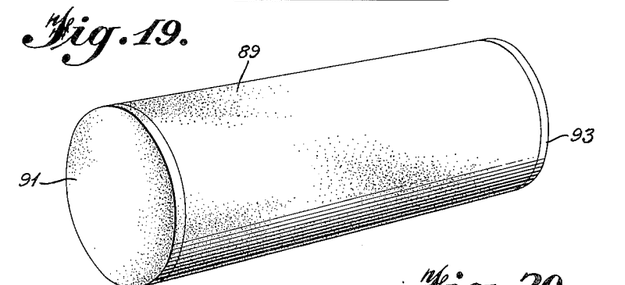
FIGURES 19 and 20 show the outside and a vertical cross-section, respectively, of a generally cylindrical neck support cushion made of profiled polyurethane foam in accordance with the present invention.
Figure 20:
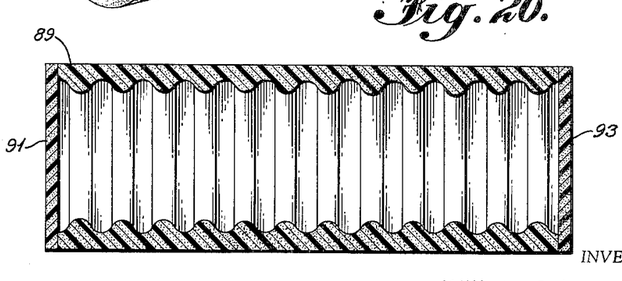

FIGS. 19 and 20 show a neck support cushion made by rolling a sheet of profiled polyurethane foam 89 into a generally cylindrical configuration with the ribs extending inwardly and a smooth outer surface, and closing the end openings thus formed therein by means of two disc-shaped pieces 91 and 93 which may be formed of non-profiled polyurethane foam or any other suitable, preferably resilient, material. The abutting edges of the sheet 89, as well as the discs 91 and 93 may be united by gluing or heat sealing. Both sides of the sheet 89 may be profiled if desired. The cross-section through the cushion (and hence the pieces 91 and 93) need not be circular, but instead may be oval, square, or any other described shape, in which case the pieces 91 and 93 will be shaped accordingly. The outer surface (as well as the inner surface if desired) of the neck support cushion may be covered with various materials such as textile fabrics, rubber filaments, resin foil material and the like, if desired. The interior of these cushions may also be filled or stuffed with various materials such as polyurethane foam pieces or scrap to provide added resiliency and support, if desired.

Figure 21:
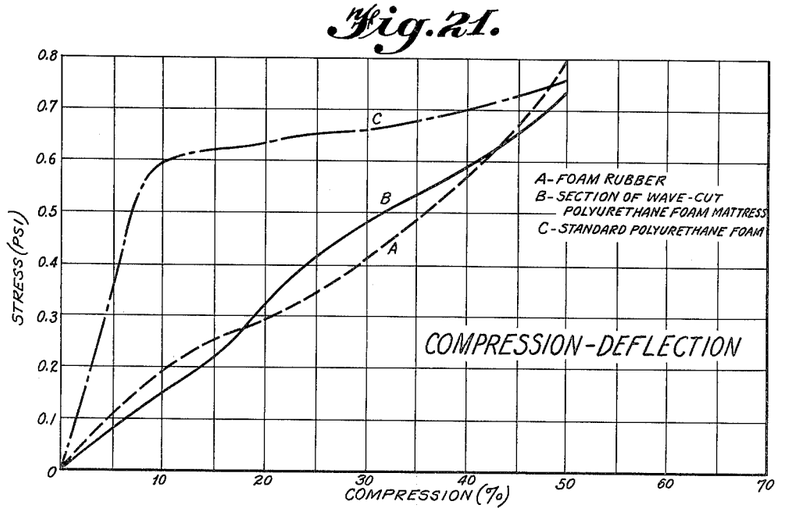
FIGURES 21 and 22 are curves showing certain compression-stress relationships that are characteristic of profiled polyurethane foam structures made in accordance with the present invention.
Figure 22:
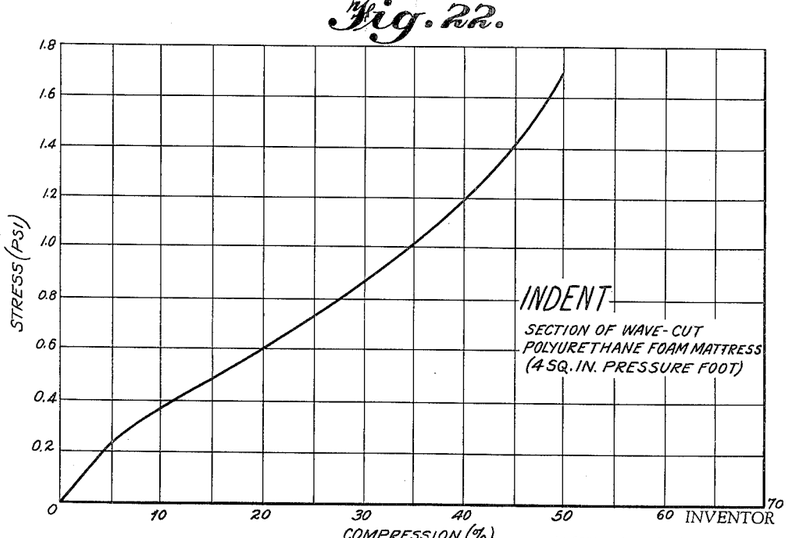

FIGS. 21 and 22 show certain relationships that are desirable characteristics of profiled polyurethane foam structures made in accordance with the present invention. More particularly, FIG. 21 shows a comparison between a curve produced by a section of wave-cut polyurethane foam matteress material, laminated as shown, e.g. in FIGS. 15, 17 and 18, and curves for standard materials such as ordinary foam rubber and standard, i.e., non-profiled, polyurethane foam. In making the tests that resulted in the curves of FIG. 21, the pressure foot covered the entire sample whereas the curve shown in FIG. 22 was obtained with a pressure foot that was smaller than the sample uindergoing test. Note particularly how, in FIG. 21, there is shown the characteristic feature of profiled polyurethane foam articles made in accordance with the present invention wherein they respond under compression very much like that of foam rubber (curve B vs. curve A) and very much more favorably than the standard or non-profiled polyurethane foam (curve B vs. curve C). Specifically, the response to stress of profiled polyurethane foam elements made in accordance with the present invention is more nearly linear, as clearly shown in FIGS. 21 and 22, in contrast to that of the non-profiled polyurethane foam material where the stress vs. compression curve (C in FIG. 21) rises quite steeply at first, later leveling out as the stress is increased. This latter gives a hard feeling to cushions and the like made from the non-profiled material. The leveling off of this curve as the stress is increased (upper portion of curve C in FIG. 21) so that it is almost parallel to the base line gives a feeling known as "falling through" or "dropping out." This curve finally picks up and continues so that the non-profiled polyurethane foam material carries a higher load than foam rubber. The deflection curve for foam rubber (curve A) starts out in almost the opposite fashion to give a soft feel at the first touch. The foam rubber then picks up its load in a gradually upward rise almost at a 45° slope. Using the sine curve profile, i.e., the wave-cut polyurethane foam construction, and especially crossing two such pieces of foam material, "straightens out" the undesirable deflection curve C normally associated with the non-profiled polyurethane foam material so that it extends at a slope of substantially 45° throughout its entire useful working range. This phenomenon which underlies all the various embodiments comprising the profiled polyurethane foam articles of the present invention is thought to at least partially account for the desirable cushioning and resiliency properties that are a feature of this invention. When articles such as cushions, mattresses, etc., made in accordance with the present invention are subjected to pressure such as by the weight of the person using same, the air contained in the empty spaces will be compressed and gradually escape through the pores of the polyurethane foam. This results in the eventual (though relatively rapid) adjustment of the cushion, mattress, etc. to the shape or form of the user, thus contributing materially to comfort. The compression-set characteristics of profiled polyurethane foam elements produced in accordance with the present invention, both at room temperature and at elevated temperature, as well as after fatigue, were found to be very satisfactory.

As has been indicated above, the present invention may be applied to polyurethane foams of all kinds without reference to their specific formulations or methods of preparation in the first instance. As is well known in the art, the manufacture of polyurethane foams involves a polyaddition type of reaction between organic polyesters and organic polyisocyanates; although as is equally well known, other polyurethane-forming reactants may also be employed such as organic polyethers, alone or in combination with organic polyesters, and organic polyisocyanates. Since World War II a substantial volume of literature has grown up dealing with the production of polyurethane plastics in general and polyurethane foams in particular, and among the earliest may be cited the book entitled "German Plastics Practice," by De Bell et al. (1946), see pages 316 and 463–465. Numerous patents in this art include Hill Patent No. 2,726,219 as well as many others that could be cited as exemplary of this rapidly growing art. In order to provide more detail concerning specific starting materials that are especially useful in making polyurethane foams from which the articles of manufacture of the present invention may be formed, while at the same time achieving as much brevity as possible herein, reference is made to copending U.S. Patent No. 2,764,565, now Reissue 24,514, the disclosure of which is hereby incorporated herein by reference. That patent has since been reissued as Re. 24,514.

While specific examples of preferred arrangements and structures embodying the present invention have been described above, it will be apparent that many changes and modifications may be made therein without departing from the spirit of the invention. It will therefore be understood that the particular details set forth above are intended to be illustrative only, and are not intended to limit the scope of the invention.

What is claimed is:

1. As a new article of manufacture, a body of polyurethane foam having at least one profiled surface comprising a plurality of ribs and grooves formed therein, said body being characterized by a compression-stress curve that approximates a straight line.

2. As a new article of manufacture, a body of cured polyurethane foam having a plurality of substantially parallel ribs and grooves formed in two opposed surfaces thereof, said body being characterized by a compression-stress curve that approximates a straight line.

3. As a new article of manufacture, a laminated structure comprising at least two bodies of cured polyurethane foam tightly bonded to each other, at least one of these bodies having a plurality of substantially parallel ribs and grooves formed in at least one surface thereof, and being characterized by a compression-stress curve that approximates a straight line.

4. As a new article of manufacture, a laminated structure comprising at least two opposed profiled cured polyurethane foam elements each having a plurality of substantially parallel ribs and grooves formed in at least one surface thereof, the ribs of each of said elements contacting the ribs of the adjacent element at an angle of substantially 90° with respect thereto, and the edges of said elements being tightly sealed in order to provide an enclosed air space between the ribs and grooves of said elements, said polyurethane foam elements being characterized by a compression-stress curve that approximates a straight line.

5. As a new article of manufacture, a body of profiled cured polyurethane foam having a plurality of substantially parallel ribs and grooves formed in at least one surface thereof, and being substantially open-ended and having sealing elements tightly bonded to and enclosing the open ends thus formed, said body being characterized by a compression-stress curve that approximates a straight line.

6. New articles of manufacture for use as seat cushions, mattresses, bed pads, upholstery coverings, soundproofing, pillows, carpet underlinings and the like, comprising at least one body of polyurethane foam having at least one profiled surface comprising a plurality of ribs and grooves formed thereon, said body being characterized by a compression-stress curve that approximates a straight line.

7. An upholstery structure of two units each having one plane surface and an opposite undulating surface, the undulating surface of one unit being opposed to the undulating surface of the other unit.

8. The upholstery structure of claim 7 in which the units are of resilient polyurethane foam.

9. The upholstery structure of claim 8 in which the undulations of one unit are transverse to those of the other.

10. The upholstery structure of claim 8 in which a sheet of resilient polyurethane foam is interposed between the units.

11. The upholstery structure of claim 10 in which the apices of one unit are opposite the valleys of the other.

12. An upholstery unit of resilient polyurethane foam having a substantially plane surface and an opposite undulating surface.

13. A cushion consisting of a body of foam plastic having a strongly sagging initial portion in its characteristic line respresenting compression as plotted against load, said body being constructed to have, in planes perpendicular to the direction of load, a cross-sectional area varying in such a manner in the direction of load as to substantially straighten out said sagging portion of the characteristic line.

References Cited by the Examiner
UNITED STATES PATENTS

| | | | |
|---|---|---|---|
| 839,834 | 1/1907 | Gray | 161—122 |
| 2,194,364 | 3/1940 | Minor | 5—361 |
| 2,584,313 | 2/1952 | Woodman | 12—38 |
| 2,785,739 | 3/1957 | McGregor et al. | 267—1 |

FOREIGN PATENTS

| | | |
|---|---|---|
| 512,395 | 7/1952 | Belgium. |
| 960,558 | 10/1949 | France. |
| 434,550 | 9/1935 | Great Britain. |

FRANK B. SHERRY, *Primary Examiner.*

CARL F. KRAFFT, IRVING MARCUS, JAMES S. BAILEY, ALEXANDER WYMAN, GEORGE L. BREHM, *Examiners.*